Figure 1:
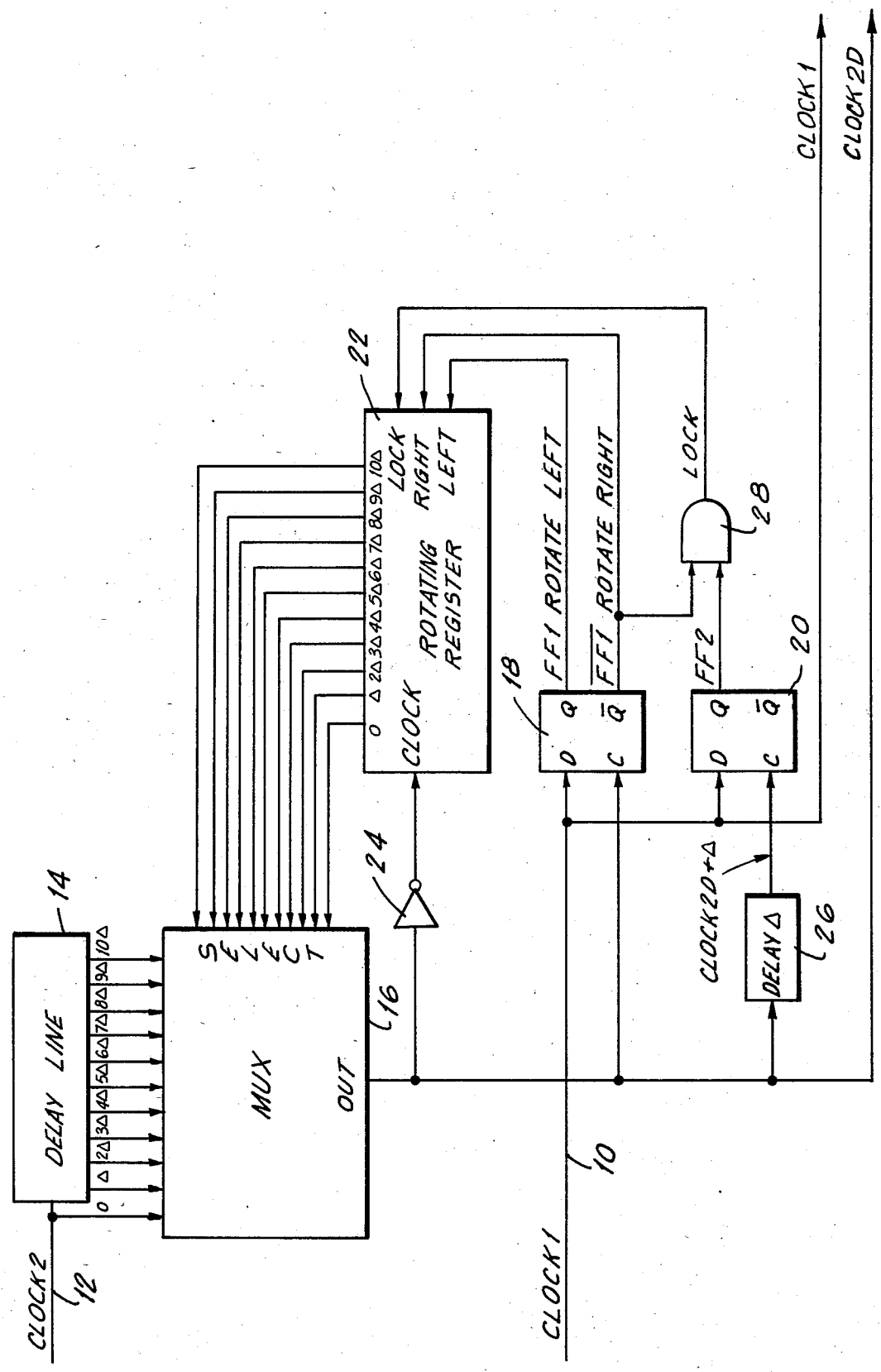

United States Patent [19]

Strenkowski et al.

[11] Patent Number: 4,604,582

[45] Date of Patent: Aug. 5, 1986

[54] DIGITAL PHASE CORRELATOR

[75] Inventors: John G. Strenkowski, Whippany; John P. Yang, BelleMead, both of N.J.

[73] Assignee: Lockheed Electronics Company, Inc., Plainfield, N.J.

[21] Appl. No.: 689,072

[22] Filed: Jan. 4, 1985

[51] Int. Cl.[4] .......................... H04J 3/06; G01R 25/04; H03L 7/00

[52] U.S. Cl. ........................................ 328/55; 328/63; 370/108; 375/107; 307/269; 377/72

[58] Field of Search .................... 328/55, 63, 155, 134; 370/108; 375/107, 118; 307/269, 511; 377/72, 76

[56] References Cited

U.S. PATENT DOCUMENTS

| 3,028,552 | 4/1962 | Hahs | 328/55 |
| 3,605,026 | 9/1971 | Bowden | 377/72 |
| 3,908,084 | 9/1975 | Wiley | 370/108 |
| 4,012,598 | 3/1977 | Wiley | 375/118 |
| 4,241,418 | 12/1980 | Stanley | 328/63 |
| 4,290,022 | 9/1981 | Puckette | 328/55 |
| 4,352,195 | 9/1982 | Dautremay et al. | 328/155 |
| 4,359,770 | 11/1982 | Suzuka | 370/108 |
| 4,386,323 | 5/1983 | Jansen | 328/63 |

Primary Examiner—John S. Heyman
Attorney, Agent, or Firm—Hopgood, Calimafde Kalil, Blaustein & Judlowe

[57] ABSTRACT

A digital phase correlator compares the relative phase of two or more high-frequency clocks and corrects for any detected phase difference. The phase detector includes a pair of flip-flops whose output is an indication of which of the two clock pulses is leading the other. The output of the flip-flop controls, through a circuit including a rotating shift register and a multitap delay line, the delay introduced to one of the clocks in a manner such that the phase difference between the clocks is reduced to a minimum.

6 Claims, 5 Drawing Figures

CASE 1

CASE 2

CASE 3

CASE 4

DIGITAL PHASE CORRELATOR

The present invention relates generally to phase correlation, and more particularly to a digital phase correlator having particular utility in synchronizing high-frequency signals.

Timing or clock signals are used to control practically all digital operations to ensure that the logical operations carried out in a digital system are performed at the correct times and in the proper sequence. Digital systems which employ clock signals include digital data-communication systems and computers and microprocessors. Many digital communication systems operate in response to a received or incoming clock signal and a free-running, internally generated clock system. For proper operation these clock signals must be properly synchronized; that is, the phase differences between them must be maintained at a minimum.

In recent years the demand for data transmissions at a ever-increasing rates has resulted in the requirement for clock signals at ever-increasing frequencies, such that clock frequencies in the order of 60–100 mHz and higher are commonly utilized.

Analog phase-locked loops, which have long been used in computer and digital communication systems to synchronize clocks of different frequencies and phases, are feedback systems that include a phase comparator, a low-pass filter and an error amplifier in the forward signal path, and a voltage-controlled oscillator in the feedback path. When no input signal is applied to the system, the error voltage is equal to zero. The voltage-controlled oscillator operates at a set frequency. If an input signal is applied to the system, the phase comparator compares the phase and the frequency of the input with the voltage-controlled oscillator frequency and generates an error voltage that is related to the phase and frequency differences between the two signals. This error voltage is then filtered, amplified and applied to the control terminal of the voltage-controlled oscillator. The control voltage forces the frequency and phase of the voltage-controlled oscillator to vary in a direction that reduces the frequency and phase differences between the output of the voltage-controlled oscillator and the input signal.

The total time taken by the phase-locked loop to establish phase lock depends on the initial frequency and phase differences between the two clock signals, as well as on the overall loop gain and the low-pass filter bandwidth. This pull-in time is relatively slow and cannot match the speed of fast digital communication systems, which require very high-speed clock phase correlation. For this reason the analog phase-locked loop systems now commercially available can operate only at frequencies of up to 35 mHz.

Digital phase-locked loop systems are also known and have been used, particularly in higher-speed applications. These digital phase-locked systems employ an EXCLUSIVE-OR gate to generate the phase error between the input and output signals and an up-down counter to replace the voltage-controlled oscillator in the analog phase-locked loop. The accuracy of the digital phase-locked loop depends on the accuracy of the fundamental clock and the loop propagation delays.

In order to maintain an acceptable accuracy in a digital phase-locked loop, the fundamental clock must have a frequency 16 or more times higher than that of the input and output signals. When the input and output signal frequencies reach the speed limit of digital components used in typical high-speed computer and digital communication systems, the much higher frequency requirement of the fundamental clock can no longer be met by any available digital components. The current, commercially available digital phase-locked loop can thus operate only up to 50 mHz.

For high-speed computer and digital communication systems with data rates of 100 mHz or more, complicated custom circuits are required to synchronize the phases of two different clocks. These circuits are very expensive to fabricate and very difficult to maintain. As a result of the rapid advancement in digital communication technologies, there is a need for a high-speed digital phase correlator that can be fabricated with commercially available and relatively low-cost digital components.

In an effort to satisfy this need, designs have been proposed to provide synchronization of high-frequency clock pulses by digital means other than in a phase-locked loop, such as those shown in U.S. Pat. Nos. 4,012,598 and 4,386,323. However, none of these devices are capable of operating at high frequencies in the range of 50 mHz or greater such that there is still a need for a practical low-cost, high-speed digital phase correlator.

It is an object of the present invention to provide a digital phase correlator capable of providing synchronization for high-frequency clock signals.

It is a further object of the present invention to provide a digital phase correlator of the type described which makes use of conventional digital components and is thus relatively low in cost and has a relatively low power consumption.

It is another, more general object of the present invention to provide a low-cost, high-speed digital phase correlator.

In the digital phase correlator of the present invention, the control circuits, namely the phase detector and phase-correction circuit, both operate at lower frequencies than the locked clock signals. The digital phase correlator comprises a delay line, a multiplexer, a rotating register and two phase detection flip-flops. When two clocks with the same frequency and different phase come into the digital correlator, one of the clocks is delayed by the delay line. This delayed clock and the other clock are fed into the phase detection flip-flops to detect the phase difference between the two clocks. Depending on the result of this phase detection, the initial delay on one clock is either increased or decreased by rotating the single ONE bit in the rotating register to the right or left, thereby to delay one of the clocks by a correct amount and thereby bring the two clocks toward phase synchronization with one another.

To the accomplishment of the above and such further objects as may hereinafter appear, the present invention relates to a high-speed digital phase correlator, substantially as defined in the appended claims and as described in the accompanying specification as considered in connection with the accompanying drawings in which:

FIG. 1 is a schematic diagram of an embodiment of a digital phase correlator in accordance with the present invention; and FIGS. 2a–2d illustrate the various phase relations of the two clocks and the resulting conditions of the phase-detect flip-flops in the digital phase correlator of FIG. 1.

Referring to FIG. 1, there is shown in schematic form an embodiment of the digital phase correlator of the present invention, which receives two clock signals Clock 1 and Clock 2 at lines 10 and 12, respectively. Clock 2 is applied to an input of a multitap delay line 14, having a plurality, here, for illustrative purposes, 10 taps, which provides delays at equal increments of $\Delta$. Thus, the delay provided to Clock 2 at tap 4 $\Delta$ is four times the incremental delay $\Delta$. The undelayed Clock 2 as well as the outputs of the taps of delay line 14 are applied as the inputs of a switching means or multiplexer 16.

The other input clock Clock 1 is applied to the data or D inputs of phase-detect flip-flops 18 and 20. The two outputs of flip-flop 18, FF1 and its inverse $\overline{FF1}$, are applied respectively to the rotate left and rotate right control inputs of a rotating shift register 22, the plural stages of which are connected to the select lines of multiplexer 16.

The output of multiplexer 16, which is the delayed Clock 2 signal or Clock 2D, is applied to the input of an inverter 24, the output of which is applied to the clock input of rotating register 22. The Clock 2D signal is also applied to the clock or C input of flip-flop 18 and to a fixed delay line 26 which introduces an additional delay of $\Delta$. The output of delay line 26, which is Clock 2D+$\Delta$, is applied to the clock or C input of flip-flop 20. The output FF2 of flip-flop 20 is applied, along with the output FF1 of flip-flop 18, to the inputs of an AND gate 28 the output of which is applied to the lock control input of register 22.

As a result of the operation of the digital phase correlator of FIG. 1, which is now described with reference to the flip-flop condition and phase diagrams of FIG. 2, Clock 1 and Clock 2D are maintained in accurate phase synchronization.

In the operation of the rotating register 22, as is known to those skilled in the art, a logic ONE signal is present in only one of the plurality of stages or bits 0, $\Delta$, 2 $\Delta$, 3 $\Delta$ ... 10 $\Delta$. Moreover, the ONE bit can be shifted between adjacent stages of rotating register 22 either to the right or to the left in response to a right or left shift control signal applied to the corresponding control input of the register. Alternatively, the ONE bit is retained or locked in its bit location when a signal is applied to the lock control input of the register.

Depending on which bit of the rotating shift register contains the logic ONE, a corresponding tap or output of the delay line 14 is enabled, that is, switched to the output of the multiplexer 16 as the delayed Clock 2D signal. That is, for example, if the ONE is located in the 8 $\Delta$ bit of rotating register 22, the 8 $\Delta$ tap of delay line 14 is connected through the multiplexer 16 to the phase-detect flip-flops 18 and 20, such that the Clock 2 input on input line 12 is delayed by 8 $\Delta$. Similarly, if the ONE is located in the 4 $\Delta$ bit of register 22, the 4 $\Delta$ tap of delay line 14 is selected by multiplexer 16 and the Clock 2D signal is, in this case, the Clock 2 signal delayed by 4 $\Delta$.

The phase differences between the Clock 1 and Clock 2D are detected by the phase-detect flip-flops 18 and 20 in the manner now described.

FIG. 2 illustrates the four conditions of relative phase between the Clock 1, Clock 2D and Clock 2D+$\Delta$ signals. In the first condition (FIG. 2a), Clock 1 leads Clock 2D but the leading edges of Clock 2D and Clock 2D+$\Delta$ both lead the falling or trailing edge of Clock 1. In the second condition (FIG. 2b), Clock 1 again leads Clock 2D but the leading edge of Clock 2D+$\Delta$ occurs later than the trailing edge of Clock 1. In the third condition (FIG. 2c), Clock 2D and Clock 2D+$\Delta$ both lead Clock 1, and in the fourth condition (FIG. 2d), Clock 1 and Clock 2D+$\Delta$ are in phase.

Figure 2A:
Figure 2B:
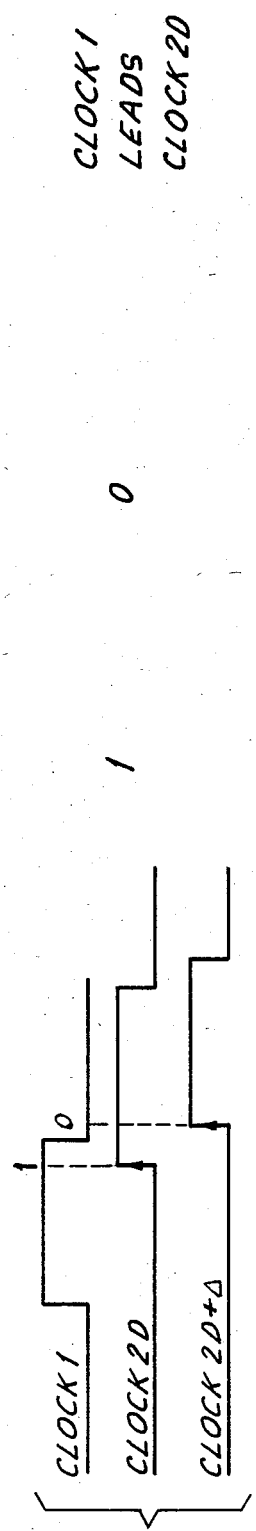
Figure 2C:
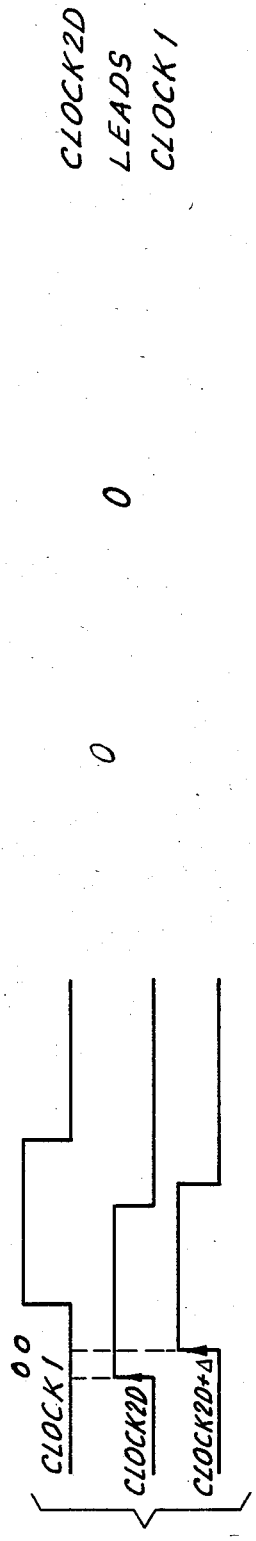

As shown in FIGS. 2a and 2b, the Clock 2D signal strobes a ONE into flip-flop 18 and the delayed Clock 2D+$\Delta$ signal strobes a ONE into flip-flop 20 in the first condition (FIG. 2a), and a ZERO into flip-flop 20 in the second condition (FIG. 2b). This implies that when FF1 is ONE (FF2 is redundant and need not be used in this decision), Clock 1 is always leading Clock 2D and Clock 2D must be shifted to the left to reduce the phase difference between these clock signals. When FF1 is ONE, a rotate left signal is sent to the rotating register 22 to cause the ONE bit to be shifted one position to the left. (The rotating register 22 is preferably initialized by establishing the ONE bit at the 5 $\Delta$ position; after the first left shift, it moves to the 4 $\Delta$ position). This 4 $\Delta$ position, in turn, selects a 4 $\Delta$ delay from the delay line 14 through the multiplexer 16, as described above, thus moving Clock 2D one $\Delta$ position to the left. This process reduces by one $\Delta$ the phase difference between Clock 1 and Clock 2D.

Figure 2D:
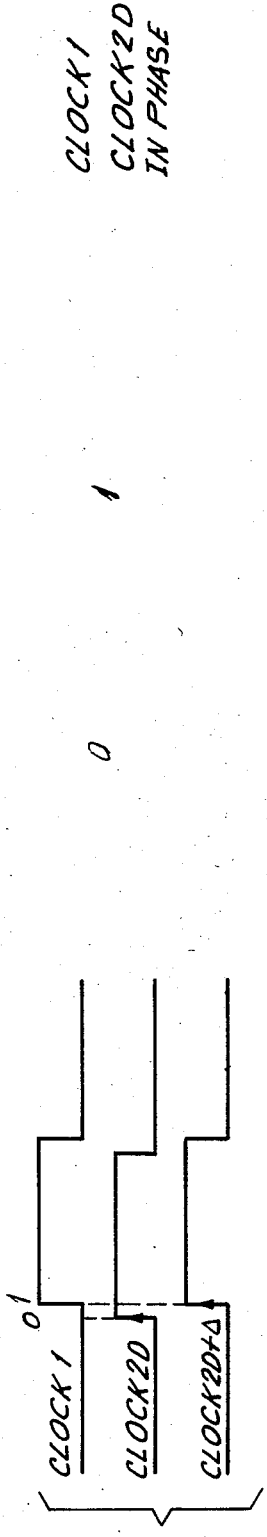

In the next clock cycle, if Clock 1 is still leading Clock 2D, the FF1 output of flip-flop 18 is set to ONE again at the leading edge of Clock 2D, and rotating register 22 is again shifted one position to the left on the trailing edge of Clock 2D to shift the ONE bit to the 3 $\Delta$ position. This removes another $\Delta$ away from the delay line 14 and moves Clock 2D one increment $\Delta$ further closer to Clock 1. This process continues until Clock 1 and Clock 2D are in phase (FIG. 2d). The in-phase condition is detected when the FF1 output of flip-flop 18 is ZERO and the FF2 output of flip-flop 20 is let to ONE as shown in FIG. 2d. When this condition occurs, AND gate 28 combines the $\overline{FF1}$ output of flip-flop 18 and the FF2 output of flip-flop 20 into a lock signal to lock the ONE bit in its current bit location in rotating register 22, thereby to lock Clock 1 and Clock 2D in phase.

It should be noted that although the input clocks Clock 1 and Clock 2 are out of phase, the output clocks Clock 1 and Clock 2D are in phase after a few clock cycles and can be used as synchronized clocks for computer and data-communication systems.

When Clock 2D is leading Clock 1, (FIG. 2c) the FF1 and FF2 outputs of flip-flops 18 and 20, respectively, are both set to ZERO. In this case, a rotate right signal is generated by the $\overline{FF1}$ output of flip-flop 18 (FF2 is redundant and need not za be used in this decision) and the ONE stored in the rotating register 22 is rotated one position to the right (initially from the 5 $\Delta$ to the 6 $\Delta$ position.) This adds one $\Delta$ to the delay of Clock 2D and moves Clock 2D one $\Delta$ position to the right. If Clock 2D is still leading Clock 1 after the first cycle, the process is repeated until Clock 1 and Clock 2D are in phase and then locked in phase as described above. The delay line 14 can be of the R-C type, or may be precision metal lines as in a VLSI circuit. Since in VLSI fabrication such a delay line can be very accurate and each increment $\Delta$ can be in the picosecond ($10^{-12}$ second) range, very high-speed and accurate digital phase correlation can be implemented with VLSI technology.

It will thus be appreciated that the digital phase correlator of the present invention provides significant advantages over the conventional digital phase-locked loop in that the digital correlator of the invention makes use of the input clock to detect and adjust the phase difference of two input clocks. The operating speed of the digital phase correlator of the invention is thus the same as that of the input clocks, as compared to conventional digital phase-locked loops, which use a master clock at a frequency 16 or more times greater than that of the input clocks to detect and adjust phase differences. The digital phase correlator of the present invention can thus expand the speed limit of phase correlation by a factor of 16 or more as compared to the conventional digital phase-locked loops.

It will also be appreciated that other modifications may be made to the embodiment of the digital phase correlator described hereinabove, other than those specifically suggested, without necessarily departing from the spirit and scope of the invention.

What is claimed is:

1. A phase correlator for detecting and correcting for phase differences between at least a first and a second signal, said phase correlator comprising a multistep delay line receiving one of said signals and effective to impart a series of different incremental delays to said one of said signals at a plurality of outputs, controllable switching means connected to said outputs of said delay line and effective in response to a first control signal applied thereto at a control input to output selectively one of said incrementally delayed signals, means for detecting the phase difference between said selected output signal of said switching means and the other of said signals and for producing a second control signal as a function of said detection, a multistage rotating register operatively connected to said phase detecting means and having a control input receiving said second control signal and a plurality of output lines operatively connected to said control input of said switching means, said rotating register being effective in response to said second control signal to provide said first control signal to said control input of said switching means, thereby to cause said switching means to output a corresponding one of said incrementally delayed signals to said phase detecting means.

2. The phase correlator of claim 1, in which said phase detecting means includes a flip-flop having a first input receiving said other of said signals and a second input receiving said outputted delayed signal from said switching means, and an output connected to said rotating register.

3. The phase correlator of claim 2, in which said phase detecting means further comprises an additional delay receiving said outputted delayed signal and imparting an additional delay to said signal, and a second flip-flop having a first input receiving said additionally delayed outputted signal and a second input receiving said other of said signals.

4. The phase correlator of claim 3, further comprising an AND gate having inputs connected to the outputs of said first and second flip-flops and an output connected to the lock control input of said rotating register.

5. The phase correlator of claim 4, in which said delay line provides substantially equal increments of multiples of a delay $\Delta$ at its said plurality of outputs, and wherein the delay of said additional delay is $\Delta$.

6. The phase correlator of claim 1, in which said delay line provides substantially equal increments $\Delta$ of delay at its said plurality of outputs.

* * * * *